US012051341B2

(12) United States Patent
Leahy et al.

(10) Patent No.: US 12,051,341 B2
(45) Date of Patent: Jul. 30, 2024

(54) PROCESSING SIMULATOR DATA

(71) Applicant: BAE Systems plc, London (GB)

(72) Inventors: Rodney George Leahy, Brough (GB); Andrew Piercy, Warton (GB); Neil Martin Bradshaw, Brough (GB); Kristopher Henry Early, Warton (GB); Duncan Kenneth Porteous, Warton (GB)

(73) Assignee: BAE Systems plc, London (GB)

( * ) Notice: Subject to any disclaimer, the term of this patent is extended or adjusted under 35 U.S.C. 154(b) by 708 days.

(21) Appl. No.: 17/292,547

(22) PCT Filed: Nov. 8, 2019

(86) PCT No.: PCT/GB2019/053156
§ 371 (c)(1),
(2) Date: May 10, 2021

(87) PCT Pub. No.: WO2020/099836
PCT Pub. Date: May 22, 2020

(65) Prior Publication Data
US 2022/0005374 A1    Jan. 6, 2022

(30) Foreign Application Priority Data

Nov. 12, 2018 (EP) .................................... 18275176
Nov. 12, 2018 (GB) .................................... 1818381

(51) Int. Cl.
*G09B 9/30*        (2006.01)
*H04N 19/172*    (2014.01)
(Continued)

(52) U.S. Cl.
CPC ........... *G09B 9/302* (2013.01); *H04N 19/172* (2014.11); *H04N 19/40* (2014.11); *H04N 19/436* (2014.11);
(Continued)

(58) Field of Classification Search
CPC ...... G09B 9/302; H04N 19/172; H04N 19/40; H04N 19/436; H04N 19/234381; H04N 19/42653
See application file for complete search history.

(56) References Cited

U.S. PATENT DOCUMENTS

2007/0217518 A1* 9/2007 Valmiki ................. H04N 19/61
 375/240.24
2010/0167816 A1* 7/2010 Perlman ............... H04N 19/436
 463/43
(Continued)

FOREIGN PATENT DOCUMENTS

| EP | 2716337 A2 | 4/2014 |
|---|---|---|
| WO | 2010054011 A2 | 5/2010 |
| WO | 2013023287 A1 | 2/2013 |

OTHER PUBLICATIONS

International Search Report and Written Opinion for PCT Appl. No. PCT/GB2019/053156, mail date May 4, 2020, 17 Pages.
(Continued)

*Primary Examiner* — David L Lewis
*Assistant Examiner* — Shauna-Kay Hall
(74) *Attorney, Agent, or Firm* — Maine Cernota & Curran

(57) ABSTRACT

At least one encoder processor of a simulator data processing system receives simulator data from a plurality of simulators comprising a plurality of video data, including first and second data having different frame rates, and non-audio/visual data, and outputs a respective plurality of compressed video streams. A scheduler of the at least one encoder processor uses frames of the video data to generate scheduled items, specifies a frame rate for capturing the frames, and generates encoded data based on the compressed video streams and the non-audio/visual simulator data. At least one further processor receives, decodes, and processes the encoded data. The at least one further processor executes
(Continued)

a media player/renderer application that processes the compressed video streams and displays on the display a plurality of the decoded video data are simultaneously displayed on a display at the specified frame rate, together with information based on the non-audio/visual simulator data.

15 Claims, 9 Drawing Sheets

(51) Int. Cl.
    *H04N 19/40*    (2014.01)
    *H04N 19/436*   (2014.01)
    *H04N 21/2343*  (2011.01)
    *H04N 21/426*   (2011.01)

(52) U.S. Cl.
    CPC ............... *H04N 21/234381* (2013.01); *H04N 21/42653* (2013.01)

(56) References Cited

U.S. PATENT DOCUMENTS

| | | | |
|---|---|---|---|
| 2011/0026608 A1* | 2/2011 | Luthra | H04N 19/174 375/E7.2 |
| 2011/0188580 A1 | 8/2011 | Valmiki | |
| 2013/0044260 A1* | 2/2013 | Vestergaard | G06F 3/14 348/E5.009 |
| 2015/0161904 A1* | 6/2015 | Beck | G09B 9/02 434/322 |
| 2016/0019808 A1* | 1/2016 | Chavez | G09B 9/302 434/38 |
| 2018/0288499 A1* | 10/2018 | Niemeyer | H04N 21/43637 |

OTHER PUBLICATIONS

Guobin, Shen et al. "Accelerating Video Decoding Using GPU", Proceedings of International Conference on Acoustics, Speech and Signal Processing. Hong Kong, China. IEEE. vol. 4.pp. 772-775. (2003).

European Search Report for European Patent Appl. No. 18275176.8, mail date Apr. 26, 2019, 8 Pages.

Great Britain Search Report for Great Britain Patent Appl. No. 1818381.4, mail date Oct. 16, 2019, 5 Pages.

International Preliminary Report on Patentability for PCT Application No. PCT/GB2019/053156, dated May 20, 2021, 11 pages.

\* cited by examiner

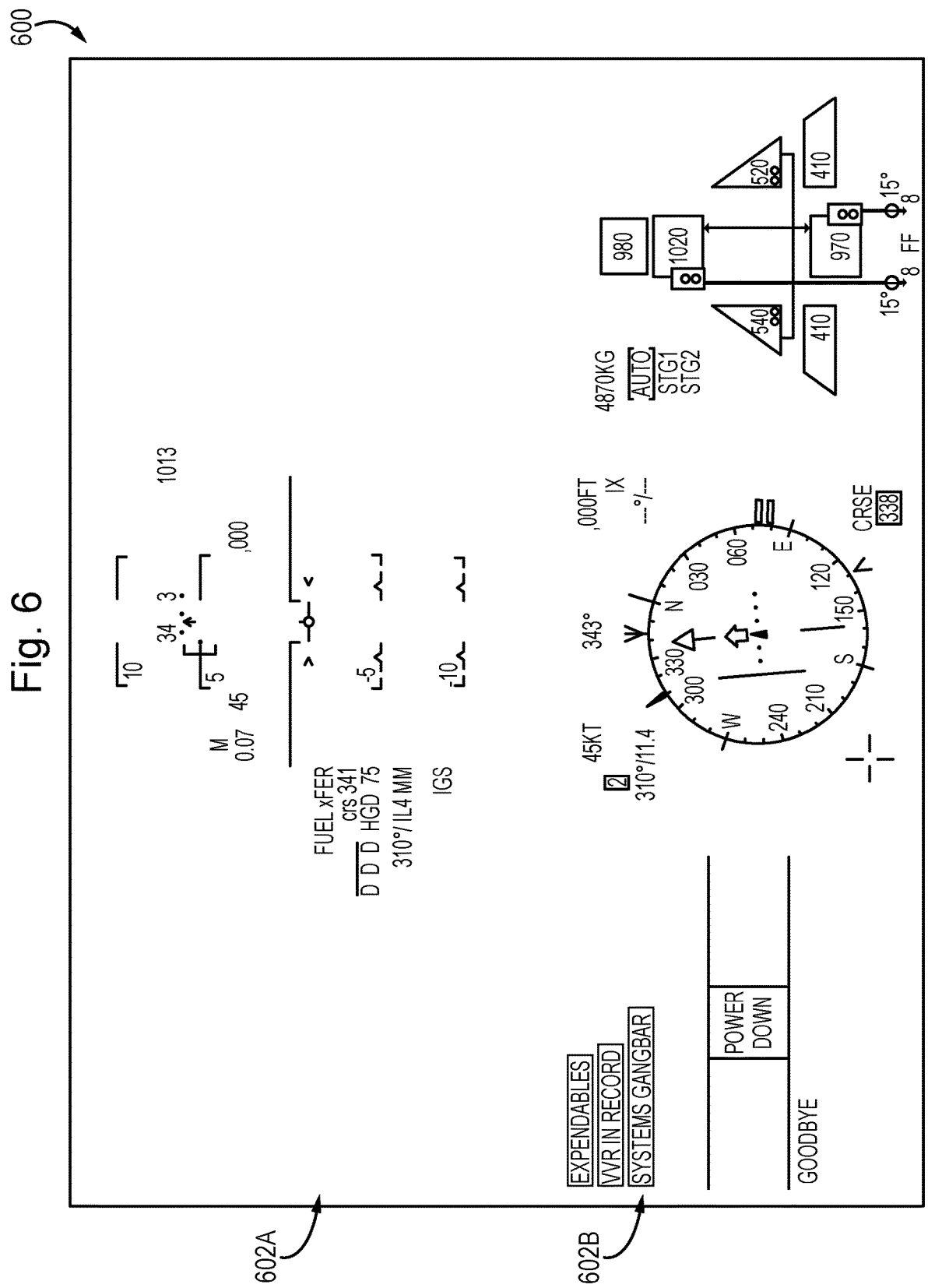

Fig. 8
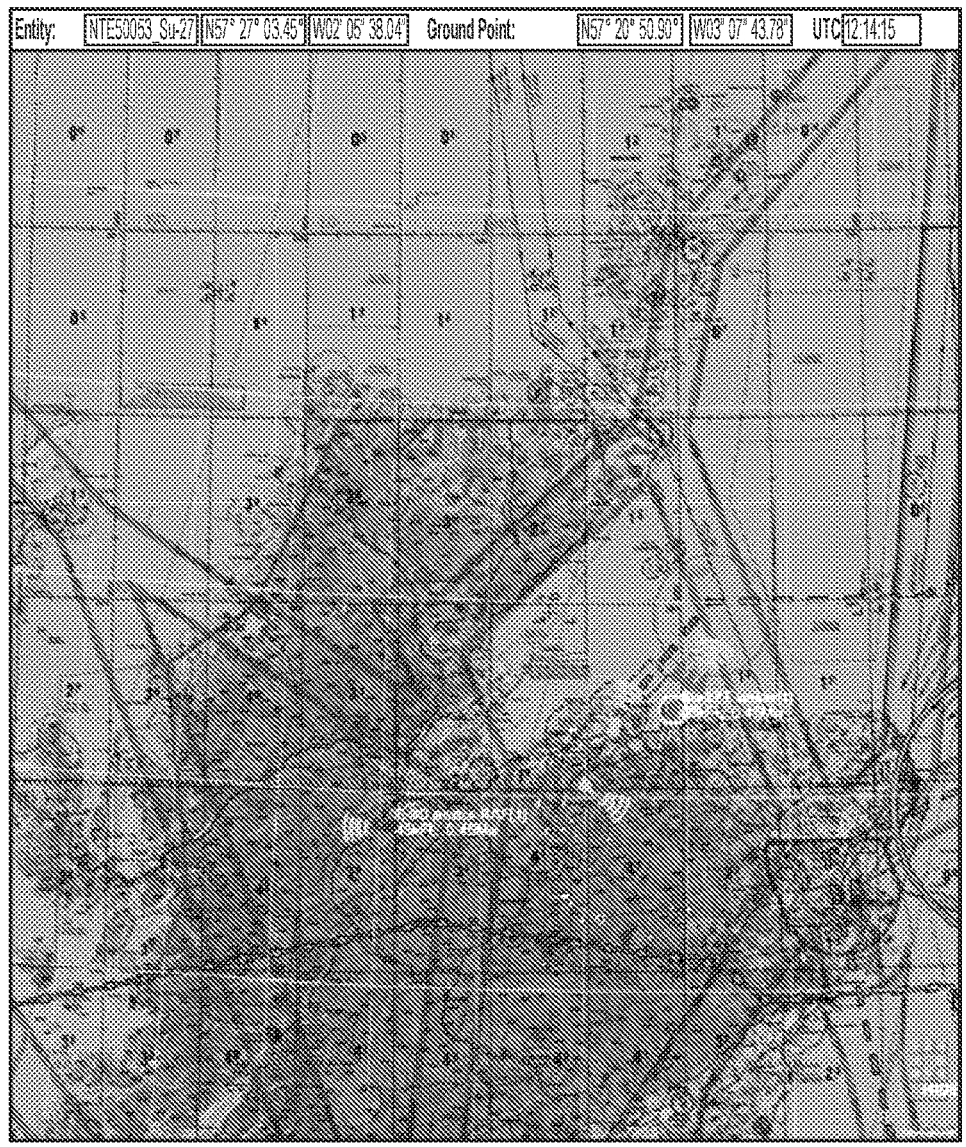
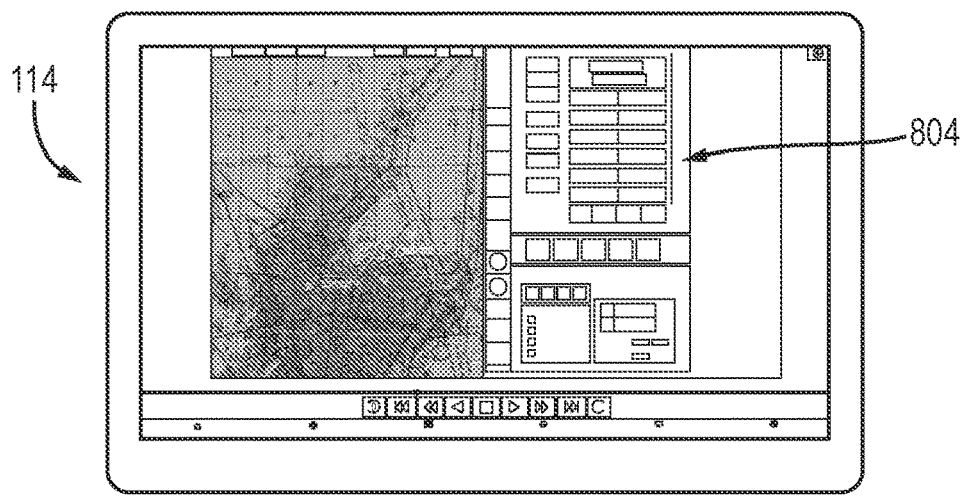

PROCESSING SIMULATOR DATA

RELATED APPLICATIONS

This application is a national phase application filed under 35 USC § 371 of PCT Application No. PCT/GB2019/053156 with an International filing date of Nov. 8, 2019, which claims priority of GB Patent Application 1818381.4 filed Nov. 12, 2018, and EP Patent Application 18275176.8 filed Nov. 12, 2018. All of these applications are incorporated herein by reference in their entirety for all purposes.

FIELD OF THE INVENTION

Background of the Invention

The present invention relates to processing simulator data.

Simulators are known devices intended to provide a realistic imitation of the controls and operation of a system. They are normally used for training purposes. Well-known examples of simulators include those that simulate vehicles, such as aircraft.

In some situations, it is desirable to carry out a review/de-brief during, or following, the use of simulators. This can involve remotely viewing data generated by the simulators by one or more persons. Theatre-style systems have been developed for this purpose and typically comprise a large video display that can replay data generated by simulators. In the case of aircraft simulators, the data replayed can include cockpit displays, pilot/instructor audio, map information, and the like. This data can be in the form of video data that is captured from the data generated by the simulators.

However, these existing systems typically use hardware encoders to capture audio and video signals, turning them into data streams and pass them to a dedicated system for recording/storing and playing back simulation data. The hardware encoders are expensive and are dedicated to the number of streams to be captured, with limited resolutions and framerates. This limits the ability to change streams without adding new hardware or changing existing hardware. Further, the volume of video data can be large, especially at high-quality resolutions and framerates. Efficiently transferring and displaying such data from multiple simulator sources, particularly during faster than real-time playback speeds either forwards or backwards in time can therefore be technically problematic.

Media players that are used to render the video and audio data typically receive the data either from a local file or as a data stream. The media players render the data streams in real time, queuing up data received until it needs to be rendered. If data is not provided at sufficient rate to draw in real-time the data is buffered and periodically render streams in real-time until the buffer is exhausted. Although some existing media players can be configured to draw the data at different rates, this is setup as part of executing the application and not dynamically switched.

Furthermore, existing media players do not normally allow the dynamic configuration of the position of each stream through an externally controllable interface, nor do they provide a video blending capability, allowing multiple streams to be combined and selectively turned on/off. WO 2010/054011 discloses a software video transcoder with GPU acceleration. WO2013/023287 describes script-based video rendering.

SUMMARY OF THE INVENTION

Embodiments of the present invention are intended to address at least some of the above technical problems.

Embodiments can provide a simulator usage debrief system with the capability to Live Monitor and/or record and playback audio, video and data synchronously from multiple simulators in any combination from simultaneously running, but independent missions, with improved performance and feature integration compared to existing debrief systems. Embodiments can use native hardware encoders on-board graphics cards to generate video streams of images such as simulator cockpit, symbology and outside world imagery at higher resolutions (such as up to Ultra-High Definition (UHD) and at higher framerates, e.g. up to 60 fps) than available through external hardware encoders or software based encoders without a negative performance impact on the computing device.

Embodiments can provide the ability to specify capture parameters (such as framerate), which are different to the source data being generated and can provide multiple instances of the same encoded video stream, each at independent framerates, to multiple end-points, thus providing increased flexibility and capability on how the video signals are encoded and streamed.

Embodiments can comprise a Media Renderer that utilises hardware decoder on-board a graphics card to render multiple video streams simultaneously and synchronously and display over separate UHD displays. Embodiments can enable the positioning of each video stream render within a display area and dynamic switching of different layout display configurations.

According to one aspect of the present invention there is provided a simulator data processing system comprising:
  a display;
  at least one encoder configured to:
  receive a plurality of simulator data generated by a respective plurality of simulators, wherein the plurality of simulator data comprises a respective plurality of video data and at least one of the plurality of video data has a different display characteristic (e.g. frame rate or resolution) to another of the plurality of video data, and
  generate encoded video data based on the plurality of video data, and
  at least one processor configured to process the encoded video data so that the plurality of video data is displayable on the display with a same display characteristic (e.g. frame rate or resolution).

The at least one encoder may be configured to capture at least one of the plurality of video data generated by a said simulator and output at least one respective compressed video stream, e.g. a H.264 stream. The at least one encoder may utilise a hardware video encoder on a Graphics Processing Unit, GPU.

The at least one encoder may comprise a scheduler configured to use frames of the plurality of video data to generate a set of scheduled items. The scheduler can specify at least one parameter for capturing the frames of the plurality of video data, e.g. capturing at a desired display characteristic, such as frame rate. The at least one encoder can provide multiple instances of the encoded video data having different frame rates to multiple end-points (e.g. of procesors/decoders). Thus, embodiments can provide increased flexibility and capability in terms of how video data is encoded and streamed.

The at least one processor may be configured to execute a media player/renderer application that renders the compressed video stream on the display. The at least one processor may utilise a hardware video decoder on a GPU. The media player/renderer may decode each video stream of the compressed video stream independently and render each said decoded video stream at a rate corresponding to a rate at which a corresponding video data of the plurality of video data is received.

The at least one encoder can transfer data describing the at least one respective compressed video stream to/from an external storage component or server.

The at least one processor may be configured to blend together at least two of the video streams of the compressed video stream for display on an area of the display. One of the video streams being blended may have a lower frame rate than another of the video streams and the media player/renderer can store a video frame from the video stream having the lower frame rate for blending with each video frame of the other (higher rate) video stream. The media player/renderer can utilise a cropping capability to maintain 1-1 pixel representation of one said video stream (e.g. HUD symbology) to blend another video said stream (e.g. outside world video), which is generated at a different resolution in the plurality of video data.

The system can include a control device for configuring/controlling a location and format of the video data on the display. The control device may offer display control functions selected form a set including: full recording and playback control (e.g. start/play/pause/stop/fast forward/rewind/jump to bookmark); playback from ¼ speed up to ×32, forward and backwards; Tactical Scenario Viewer; Timeline and Event markers (manual and automatic bookmarks); audio channel and video display layout control; audio volume control; recording or device to Live Monitor selection; video stream layout selection; playback navigation (timeline and event bookmarks); tactical map management; recording management (favourite, delete, archive, etc); cropping of video streams, and synchronised playback of audio.

In some embodiments the control device may comprise a computing device with a touchscreen.

The system may control the display to display a tactical map. The control device may include a control interface for the tactical map, wherein the control interface is not visible on the tactical map displayed on the display. The system, e.g. the control device, may be configured to execute a software application that can process data describing individual map/geographical features (as opposed video data) of the tactical map.

The at least one encoder may be located in a said simulator.

According to another aspect of the present invention there is provided a (computer-implemented) method of processing simulator data, the method comprising:

receiving a plurality of simulator data generated by a respective plurality of simulators, wherein the plurality of simulator data comprises a respective plurality of video data and at least one of the plurality of video data has a different display characteristic (e.g. frame rate or resolution) to another of the plurality of video data; generating encoded video data based on the plurality of video data, and processing the encoded video data so that the plurality of video data is displayable on the display with a same display characteristic (e.g. frame rate or same resolution).

According to a general aspect of the present invention there is provided a simulator data processing system comprising:

a display;

at least one encoder configured to receive a plurality of simulator data generated by a respective plurality of simulators, wherein the plurality of simulator data comprises a respective plurality of video data, and at least one processor configured to selectively control display of the plurality of video data on the display. There is also provided a method corresponding to this general aspect.

According to another aspect there is provided at least one simulator data encoder configured to receive a plurality of simulator data generated by a respective plurality of simulators, wherein the plurality of simulator data comprises a respective plurality of video data, and to generate encoded video data based on the plurality of video data.

According to yet another aspect there is provided at least one simulator data decoder configured to process encoded video data for display. The decoder may decode encoded video data based on a respective plurality of simulator data to produce decoded video data, wherein at least one of the plurality of encoded video data has a different display characteristic to another of the plurality of encoded video data, and process the decoded video data so that the plurality of decoded video data is displayable on a display with a same display characteristic.

According to another aspect there is provided a computer program product comprising instructions which, when the program is executed by a computer, cause the computer to carry out methods substantially as described herein.

According to other aspects of the present invention there is provided a computer device or simulator configured to execute a method substantially as described herein.

BRIEF DESCRIPTION OF THE DRAWINGS

For a better understanding of the invention, and to show how embodiments of the same may be carried into effect, reference will now be made, by way of example, to the accompanying diagrammatic drawings in which:

FIG. 6 is another example display output by the display;

FIG. 8 illustrates another example user interface provided by the control device to interact with a tactical map display.

DETAILED DESCRIPTION

Figure 1:
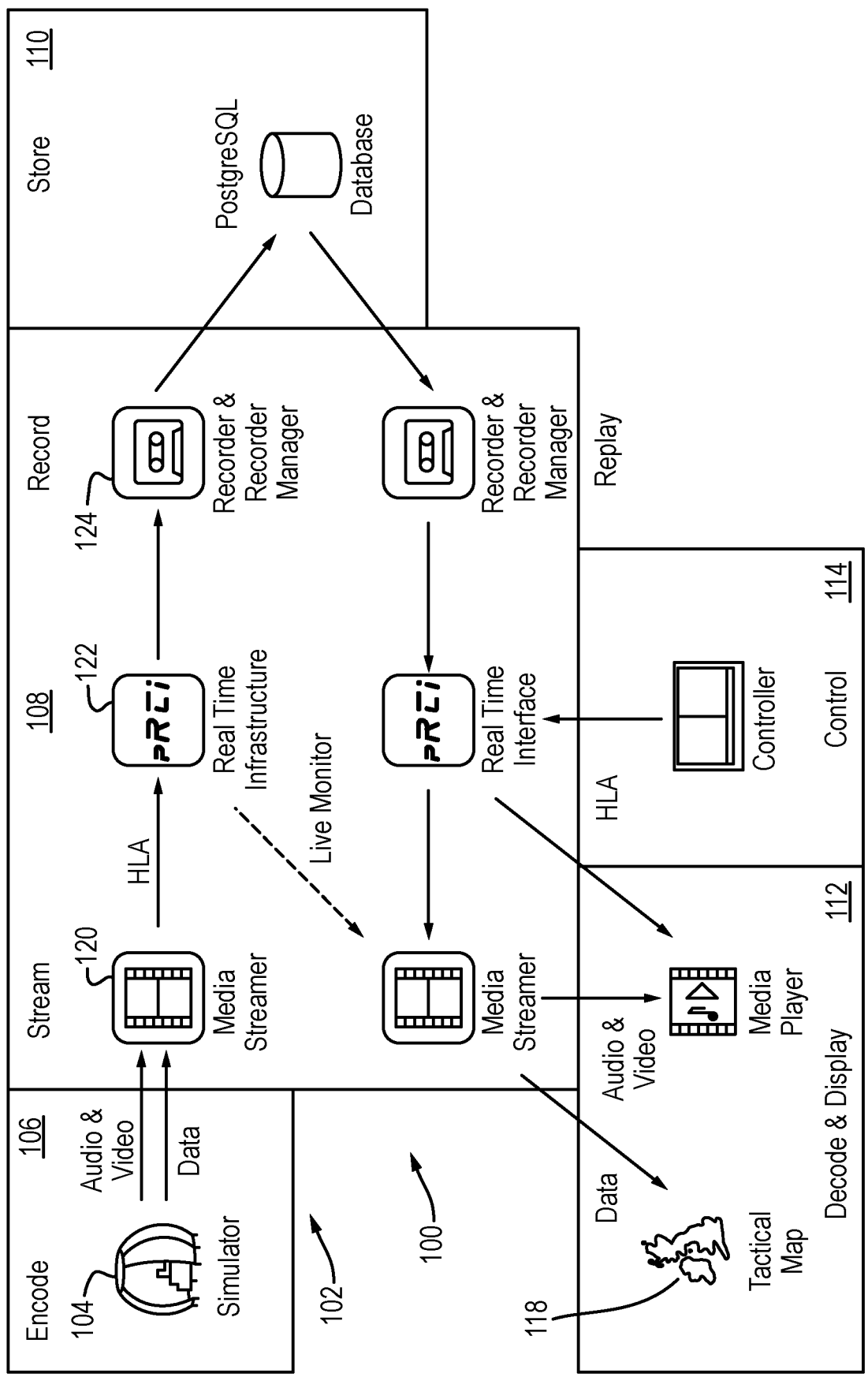
FIG. 1 is a block diagram of an example simulator data processing system, including an encoding component and a decoding/display component.

FIG. 1 is a block diagram of an example simulator data processing system 100. The system comprises (or may be in communication with) a plurality of simulators 102 (one only shown for clarity). Each simulator may be configured with software that simulates a system. In some embodiments the simulated system may comprise a vehicle such as an aircraft, including military aircraft or other vehicles such as tanks, boats and submarines, but it will be understood that other types of systems may also be simulated. The system to be recorded is not limited to vehicle simulators but can be applied to any system whereby a display is to be recorded and played back in a synchronised manner with other displays that maybe generated by different systems.

The simulators 102 may comprise a range of device types, which can have various Human Machine Interfaces, such as a physical cockpit, visual projection system, instructor console, etc. At least some of the simulators may share a common system architecture and can be based on a combination of re-hosted aircraft software and simulated software. Examples of suitable simulators can include an Avionics Part Task Trainer (APTT), an Enhanced Typhoon Avionics Demonstrator (ETAD+), and an Emulated Deployable Cockpit Trainer (EDCT). The simulators may provide training activities from cockpit familiarisation, emergency procedural training, operational tactical training and mission rehearsal in a networked environment, and can also provide wide area network support for collective training with other distributed simulators (e.g. E3, Type 45) through Air Battle-Space Training Centre (ABTC). It will be appreciated that these examples are non-exhaustive.

Typically, at least one of the plurality of simulators 102 will differ in at least one respect from the other simulators. For example, a particular simulator may generate video data that has a different display characteristic, such as frame rate and/or resolution, to video data that is generated by another of the simulators. Examples of other differences between the simulators include different formats of data, such as Tactical Scenario data or Audio data.

In general, each of the simulators 102 will comprise at least one computing device 104. The/each computing device can be substantially conventional and will include (or be associated with) at least one processor and internal memory (e.g. Random Access Memory), and can also have an interface that allows communication with other devices, e.g. via any suitable wired/wireless interface and/or communications network. The internal memory can store data and instructions for processing by the processor(s). Each computing device may also include (or be associated with) further conventional features, such as non-volatile storage device(s), a user interface, and so on, which need not be described herein in detail.

In some embodiments, the computing device 104 of a simulator 102 is configured to perform the functions of an encoding component 106 of the system 100. In alternative embodiments, the encoding functions may be performed by a separate computing device that is in communication with the simulator 102. The encoding component typically encodes data generated by the simulator 102 so that it can be processed (e.g. for display/playback) by another component of the system 100. The data generated by the simulator can include at least video data, and typically further includes audio data as well as other non-audio/visual data, such as sensor readings, geographical/location information, mission-related information, etc.

In some embodiments, the encoded data can be transferred from the plurality of simulators 102, which each include a respective encoding component 106, to a recording/playback system component 108 of the system 100. The recording/playback system component can comprise at least one computing device or server that is in communication with the simulators 102 and other components of the system. The recording/playback system component can transfer data to/from a storage component 110 (which may comprise at least one computing device or server) and/or to a decode/display component 112 (which may comprise at least one computing device or server). In some embodiments, the system 100 can further include a control device 114, which a user can use to control components of the system. The components of the system can communicate with each other over any suitable wired or wireless network(s)/connection(s), including the internet, provided the bandwidth of the connection is adequate to carry the data streams.

Thus, embodiments of the system 100 can provide a mechanism for encoding and streaming multiple video, audio and data feeds from the plurality of simulators 102. The recording/playback system component 108 can capture and store streams in a synchronised manner with sufficient bandwidth to provide high speed playback. Embodiments can allow a user to present and manage video, audio and data generated by the simulators using the control device 114. Embodiments can also offer integration of separate systems to provide a coherent front end interface to users.

Figure 2:
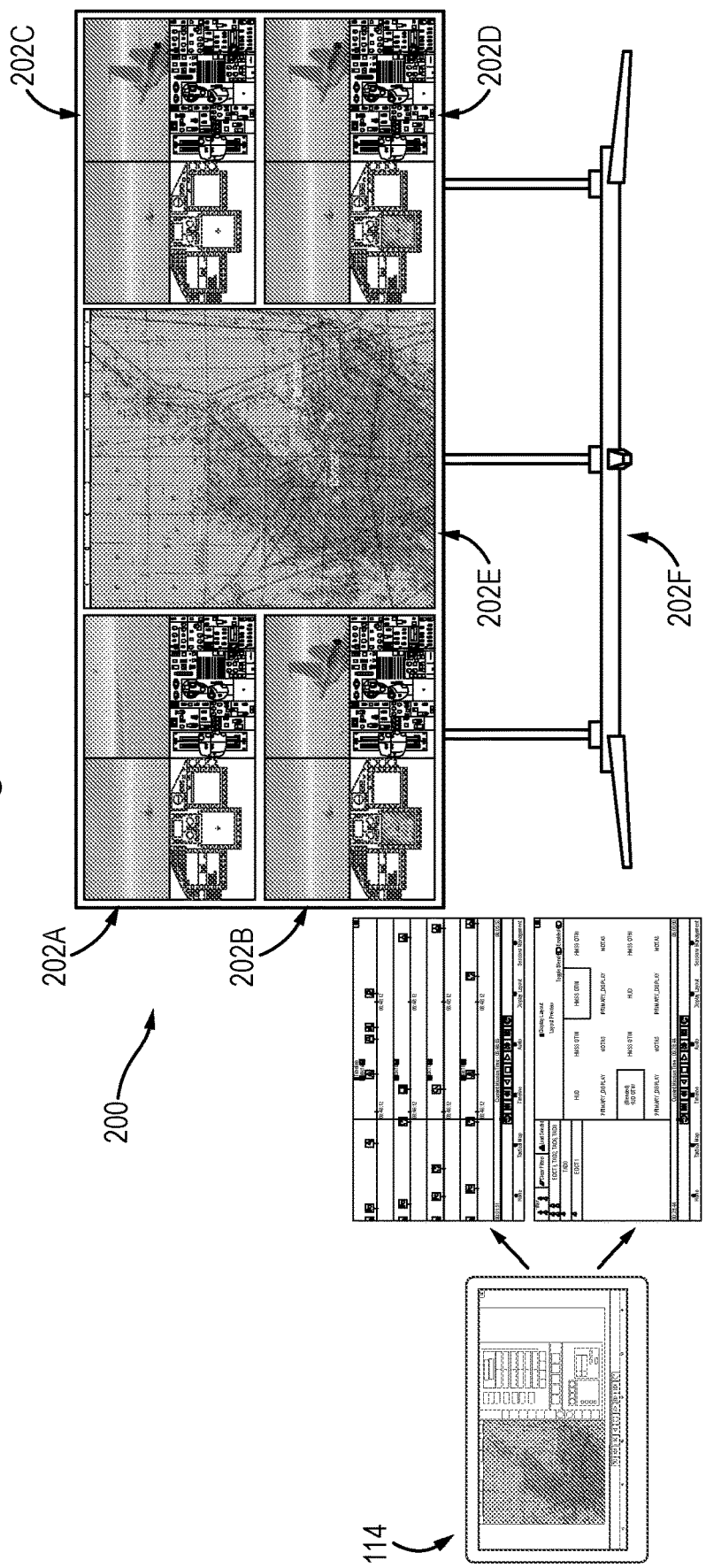
FIG. 2 illustrates examples of some physical components of the system, including a display and a control device.

FIG. 2 illustrates some physical components of an example system 100. The system includes a display 200 that can comprise at least one display device. The display can be in communication with other components of the system, in particular the decode/display component 112 and the control device 114. In the illustrated example, the display comprises a video wall display that includes six display devices 202A-202F (e.g. 6×139.7 cm (55") UHD 3840×2160 high contrast IPS monitors). In a specific example, the control device 114 comprises a computing device having a touchscreen. In a specific example the control device comprises a 39.6 cm (15.6") portable (tethered) HD touch screen that provides a single point of control. However, it should be appreciated that these components are exemplary only and many variations are possible; for example, different display technologies (e.g. LED, OLED, LCD, etc) can be used for one or more of the display devices; the control device can include a different type of user interface (e.g. keyboard, mouse, etc) or may be integrated in a computing device that also performs other system functions, and so on.

In use, the display devices 202A-202F can display graphical and/or other information based on the data generated by one or more of the simulators 102 and processed by the system 100. Related information, such as a tactical map that shows positions of the simulated aircraft and mission-related targets, can also be processed and displayed on one or more of the display devices. The control device 114 can be used to configure/control the content, location, format, etc, of the displayed information. Examples of functions that can be provided by the control device include: full recording and playback control (e.g. start/play/pause/stop/fast forward/rewind/jump to bookmark); playback from ¼ speed up to ×32, forward and backwards; Tactical Scenario Viewer range of situational awareness functions; Timeline and Event markers (manual and automatic bookmarks); audio channel and video display layout control; audio volume control; recording or device to Live Monitor selection; video stream layout selection; playback navigation (timeline and event bookmarks); tactical map management; recording management (favourite, delete, archive, etc).

Thus, embodiments of the system 100 can provide a "Theatre Style" Record Replay debrief facility for the simulators 102. Text displayed by the system may be readable up to a distance of 5 m, for example, and can be controlled via a single hand held control device 114. Embodiments can provide playback of stored (and/or Live Monitoring of) audio, video and data generated by the simulators in a synchronised manner. Embodiments can record any combination of simulator devices, from simultaneously running, but independent missions, and to linked (e.g. up to 4 devices) multi-ship scenarios. Embodiments can offer simultaneous record and playback or Live Monitoring.

More detailed descriptions of the components of the system 100 will now be given.

Figure 3:
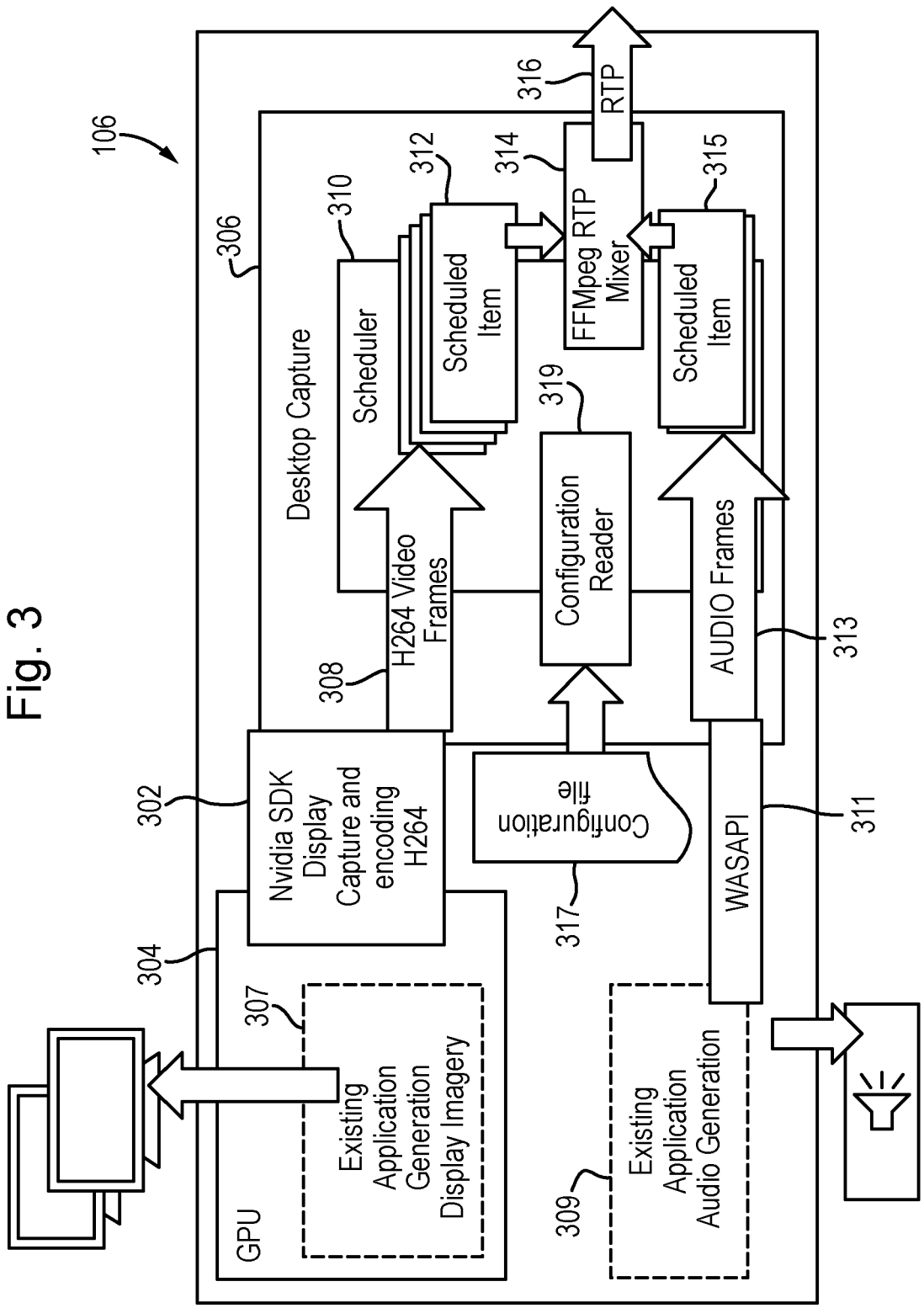
FIG. 3 is a block diagram of an example of the encoding component.

FIG. 3 schematically illustrates an example of the encoding component 106. In some embodiments the component utilises a hardware video encoder 302 on a Graphics Processing Unit (GPU) 304, rather than encoding using a Central Processing Unit of a computing device 104 of the simulator 102. GPU processing is very efficient, high performance and low latency and does not negatively affect the performance of existing applications. An example of a suitable hardware video encoder is NVENC built into an NVidia™ graphics card that can connected to the computing device 104. Alternative hardware video encoders may be used, such as Video Coding Engine built into AMD graphics cards or external hardware encoders such as a Epiphan VGADVI Broadcaster.

In some embodiments a capture application 306 executing on the computing device 104 uses the hardware video encoder 302 to capture video images generated by an application that is a part 307 of the simulator 102 that generates video and outputs these as a compressed video stream 308, e.g. H.264 in the specific example. Again, it will be understood that this is exemplary only and other forms of video data may be output, e.g. H.265, VC-1.

In some embodiments the capture application 306 uses Windows Audio Session API (WASAPI) 311—although alternative means could be used, such as MP3, AAC, etc—to capture audio generated by an application that is a part 309 of the simulator 102 that generates audio and outputs these as audio frames 313.

In some embodiments a scheduler application 310 executing on the computing device 104 can receive the H.264 frames 308 and produces a first set of scheduled items 312. The scheduler is a component of the capture application 306 that can ensure that the individual displays are captured at the correct framerate. The scheduler application 310 can also receive the audio frames 313 and produces a second set of scheduled items 315. A FFMpeg library 314 can provide Real-time Transport Protocol (RTP) transmission 316 of the scheduled items over User Datagram Protocol (UDP). The RTP transmission can be made over Ethernet to the recording/playback component 108. In some embodiments other data generated by the simulator 102, such as Tactical Scenario data, which may be in a proprietary format, may also be packaged into UDP data packets and converted into an Ethernet stream. The Tactical Scenario Data may also conform to the Distributed Interactive Simulation (DIS) IEEE standard or HLA standards and may be passed directly into the RTI.

A configuration file 317 defines the desktop displays to capture, including the framerate and encoding parameters to use. It also defines the end point to send the stream, in terms of IP address and port number. The configuration Reader 319 parses the configuration file and passes these parameters into the desktop capture application 306.

Referring back to FIG. 1, in some specific embodiments the recording/playback component 108 is at least partially implemented using software tools produced by Pitch Technologies of Sweden. Alternatives to the Pitch Technologies tools, such as those produced by VT Mak of Cambridge, Mass., USA, may be used in other embodiments. Thus, embodiments can use COTS (Commercial Off The Shelf) software applications that run on standard COTS PC equipment and so can provide a flexible system allowing modification/future growth.

Pitch Technologies' Media Streamer tool 120 can encapsulate Ethernet data packets in a High Level Architecture (HLA) wrapper and publishes them on a Pitch pRTI™ 122. Pitch pRTI™ is a simulation infrastructure that enables exchange of data and synchronising of events between simulators. The recording/playback component can also use Pitch Technologies Recorder and Recorder Manager tools 124. The Recorder can be used to record and playback the Pitch pRTI™ data. The Recorder Manager can be used to provide a HLA interface to control Pitch Recorder. The Media Player decodes each video stream independently and renders it at the same rate (and/or resolution) that the video data is received. For example, an encoded video stream having a frame rate of 50 fps may be decoded and processed so that it is output as a video stream having a frame rate of 60 fps. In another example, a high resolution encoded video stream may be output at a lower resolution for display. When blending two video streams together that have different rates then the player will store a video frame from the lower rate video for blending and use with each frame of the higher rate video.

In some embodiments, the Pitch Recorder of tools 124 can send/receive data to/from the storage component 110 of the system 100. In some specific embodiments the storage component comprises four HP Z6 workstations and a Proliant DL380 Server with 10 Gb Ethernet networking. In some specific embodiments the storage component implements a PostgreSQL database with NVMe Solid State Drive (SSD) for read/write performance; mechanical drives (Raid 10) for bulk storage, and network storage with removable drives for long term archiving. This can provide a mechanism for recordings made by the system between high performance SSDs and mechanical drives. It will be understood that alternative implementations (e.g. non-SQL based) of the storage component are possible.

As illustrated schematically at the bottom of the recording/playback component 108, the Pitch Media Streamer tool 120 can convert HLA data (received from the storage component 110 via tools 124 and 122) back to the original Ethernet stream with a configurable target IP address/port number, thereby allowing it to transfer recorded simulator data to the decode/display component 112. In some embodiments, Live Monitoring of simulator-generated data can be provided by directly transferring the Pitch pRTI™ 122, via the Media Streamer 120, to the decode/display component.

Figure 4:
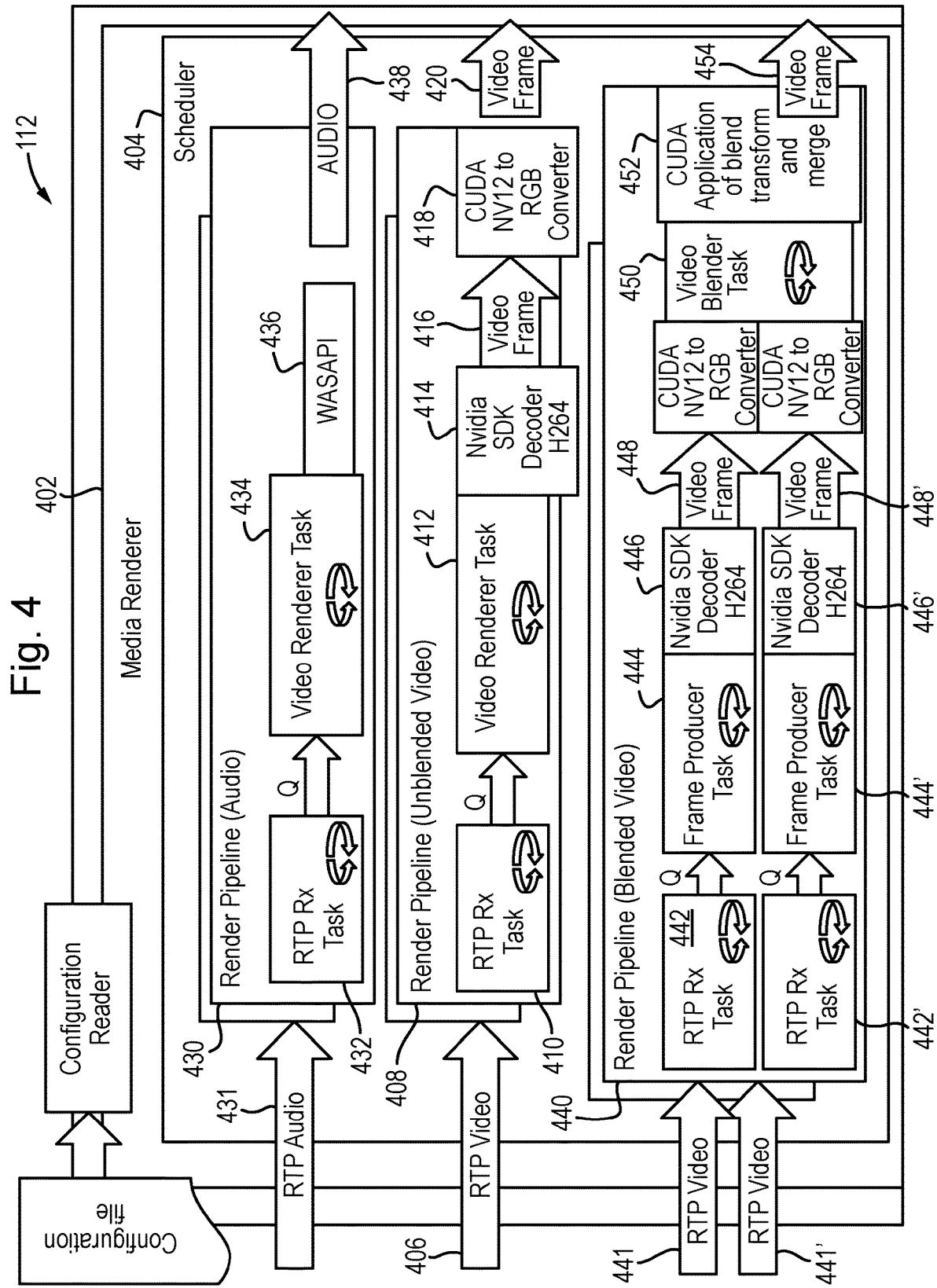
FIG. 4 is a block diagram of an example of the decoding/display component.

FIG. 4 schematically illustrates an example of the decode/display component 112. The component comprises a media player/renderer application 402, which includes a scheduler application 404, that can render the H.264 RTP video stream 406 received from the Media Streamer tool 120 of the recording/playback component 108. This can utilise a hardware video decoder on a GPU connected to the at least one computing device that implements the decode/display component 112, rather than using the CPU of that computing device(s). An example of a suitable hardware video decoder is NVDEC built into an NVidia™ graphics card that can connected to the computing device. However, alternative hardware video decoders may be used, such as AMD Unified Video Decoder.

In embodiments that use NVDEC, a respective video rendering pipeline 408 is implemented for each video data generated by the plurality of simulators 102. Each pipeline can comprise an RTP receive task 410, followed by a video renderer task 412, which can use an NVidia™ SDK H.264 decoder to produce a video frame 416 that is used by an NVidia™ CUDA VN12 to RGB converter 418 to output a video image 420. This can be displayed in a suitable/user-defined manner on the display 200.

In some embodiments, a respective audio rendering pipeline 430 is implemented for each audio data 431 generated by the plurality of simulators 102. Each pipeline can comprise an RTP receive task 432, followed by an audio renderer task 434, which can use WASAPI 436 to produce audio output 438. This can be output in a suitable/user-defined manner by the display 200 (or other connected audio output device/speaker(s)), typically synchronised with the corresponding video image.

In some embodiments, the system 100 offers the ability to display multiple video streams in a blended (selectively superimposed) manner. Streams from different data produced by the same, or different, simulator 102 may be blended, e.g., embodiments may blend multiple video streams together to enable the overlay of HUD symbology with the outside world generated image and enable switching on/off of background; however, it will be appreciated that alternative blended images are possible. Embodiments may use GPU processing to blend two (or more) video streams together using chroma-keying and luminescence filtering and ability to dynamically switch blending on/off. An example is blending monochrome symbology on one video stream and overlaying with full colour outside world imagery, with outside world imagery switchable off to aid symbology readability. The blended images may be user-defined, e.g. selected using a user interface provided by the control device 114.

Some specific embodiments can use Nvidia's CUDA™ toolkit for blending video. A respective video rendering pipeline 440 is implemented for set of video data to be blended. In the example, the set comprises two source video data 441, 441', but it will be appreciated that the number can vary. The pipeline comprises first and second RTP receive tasks 442, 442', followed by first and second frame producer tasks 444, 444', which can use NVidia™ SDK H.264 decoders 446, 446' to produce video frames 448, 448' that a video blender task 450 uses, in combination with a CUDA application 452 comprising blend, transform and merge tasks, to output a blended video image 454. This can be displayed in a suitable/user-defined manner on the display 200. Embodiments can utilise the cropping capability to maintain 1-1 pixel representation of the HUD symbology when blending with outside world video, which is generated at a different resolution. In some embodiments, the media player can render Intraframes (I-frames) at greater than ×1 speed playback, or when playing video in reverse.

Figure 5:
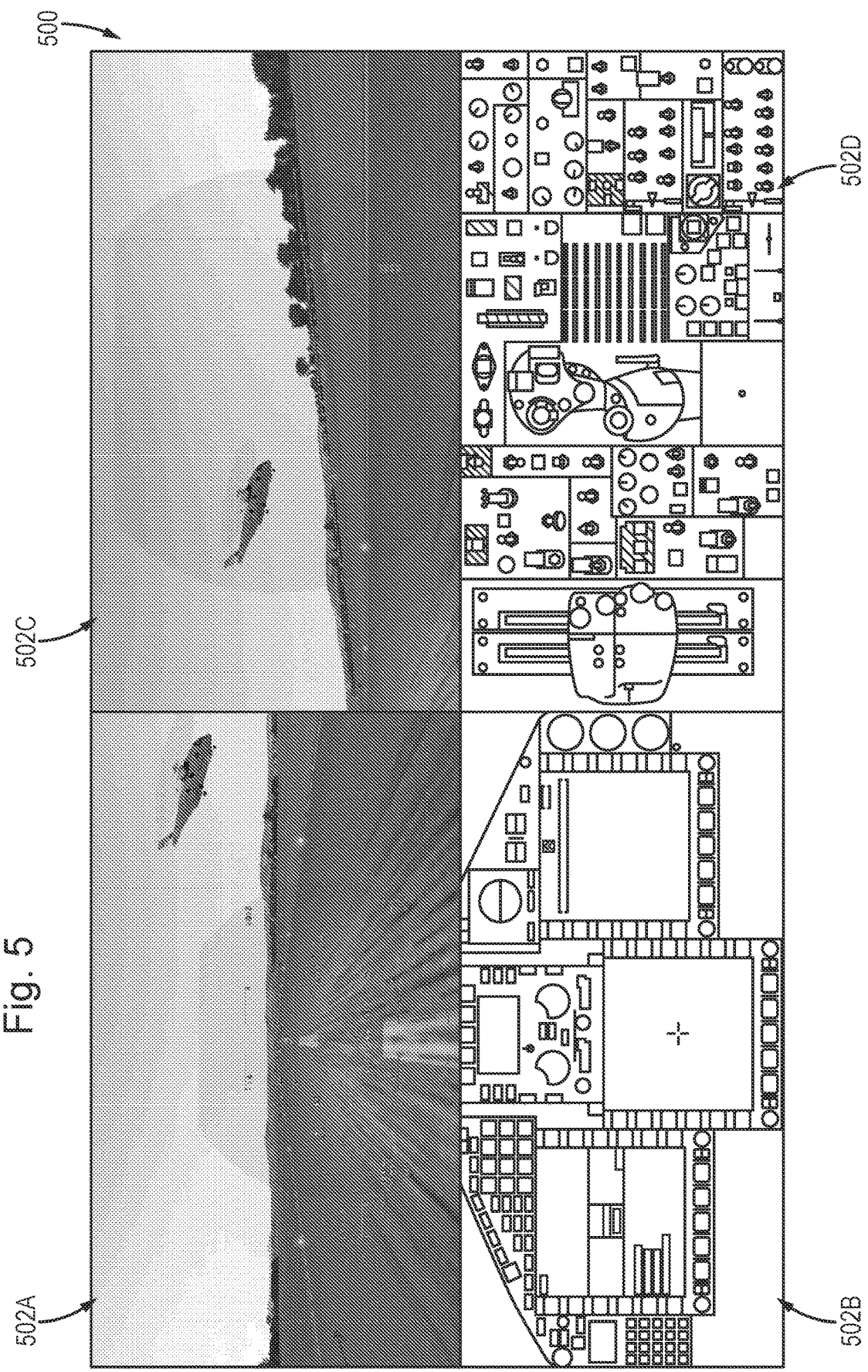
FIG. 5 is an example display output by the display.

FIG. 5 illustrates an example screen display 500 produced by the system 100 and displayable on the display 200. The example display includes four sets of video data 502A-502D that are based on various data generated by one of the simulators 102. Each video data is fitted in a respective quarter of the display, but it will be understood that the source(s), number and arrangement of the video data displayed can vary and may be selected using the control device 114. In a specific example a single video stream from the many streams available may be selected to be drawn full screen.

The first video data 502A of the example display 500 comprises HUD symbology and the outside world. In some embodiments, the control device 114 may be used to switch the background on/off to leave only the symbology visible. The second video data 502B comprises a helmet mounted symbology system and outside world generated image. The third video data 502C comprises the primary displays of the aircraft. The fourth video data 502D comprises Hands On Throttle-And-Stick (HOTAS) and cockpit switches displays. In some embodiments, a switch may be highlighted on the display when it is changed by the simulator user.

FIG. 6 illustrates another example screen display 600 produced by the system 100 and displayable on the display 200. The example display includes two sets of video data 602A-602B that are based on various data generated by one of the simulators 102. The video data 602A, shown in an upper half of the display, comprises HUD symbology and outside world generated image. The video data 602B, shown in the lower half of the display, comprises individual multifunction head down displays.

Figure 7A:
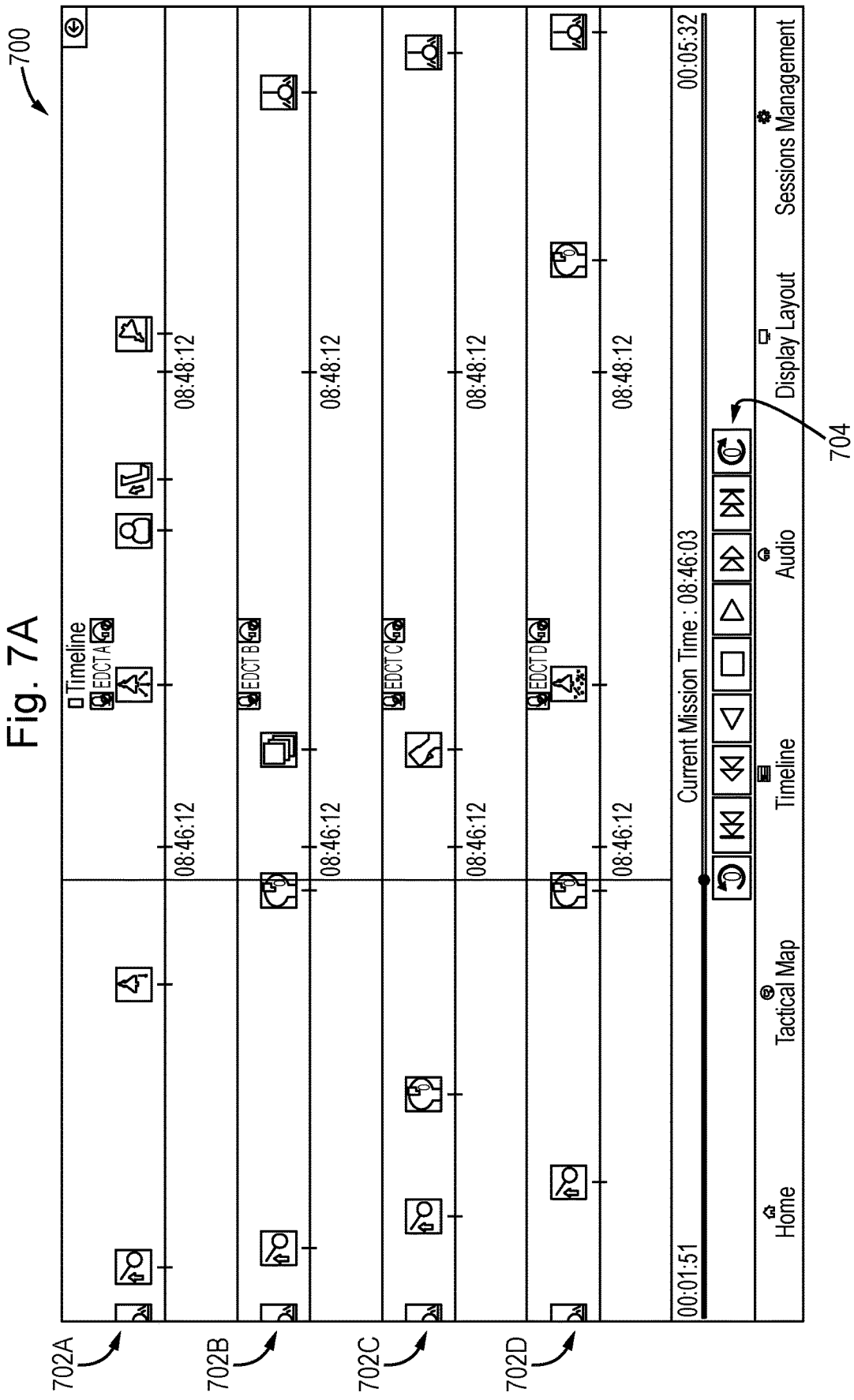
FIGS. 7A-7B illustrate examples of the user interface provided by the control device.
Figure 7B:
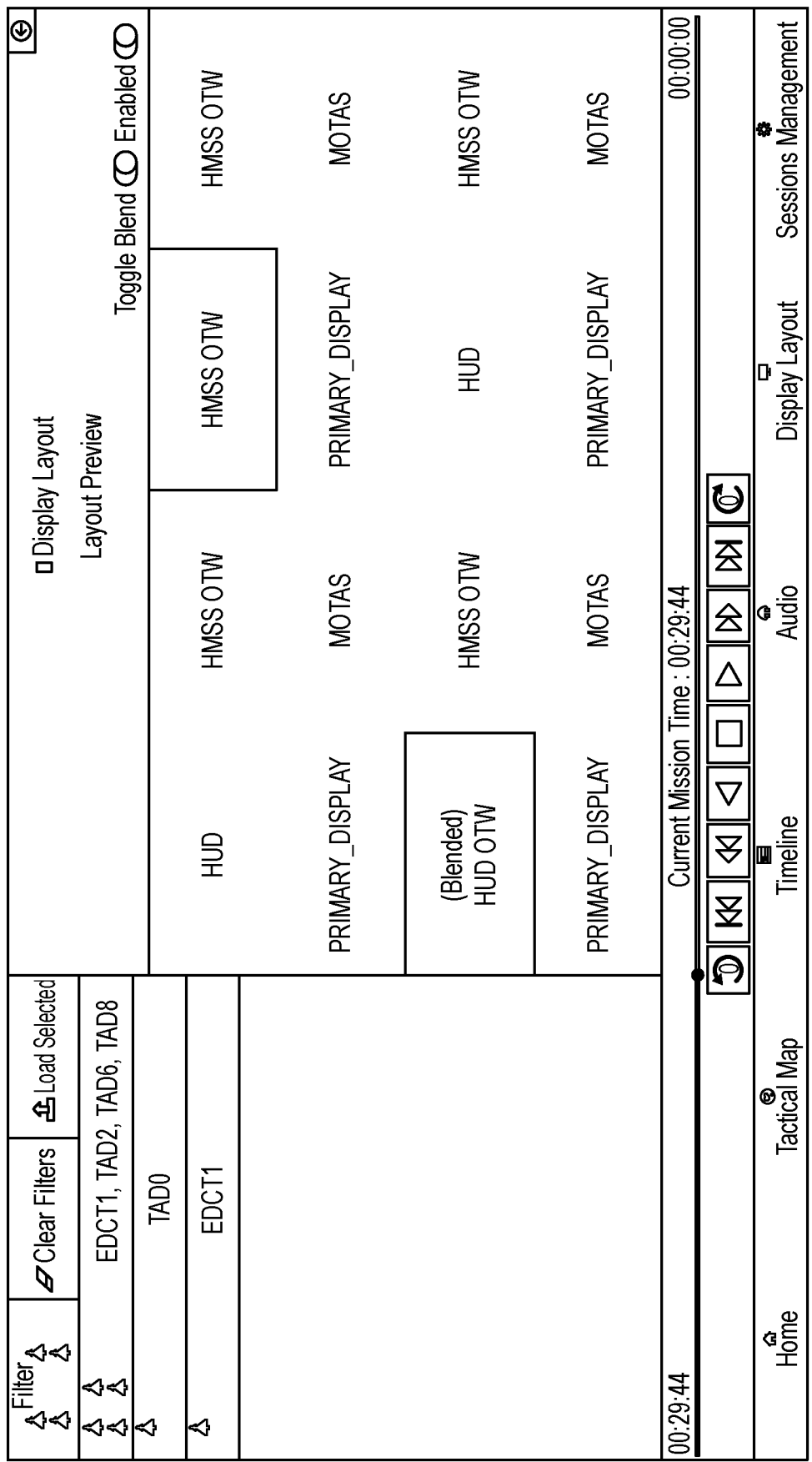

FIGS. 7A-7B illustrate examples of the user interface provided by the control device 114. The user interface is provided by at least one application executing on the control device and can communicate with other components of the system 100, particularly the recording/playback component 108, the decode/display component 112 and the display 200, using any suitable wired or wireless network/connection, e.g. Bluetooth™ or Wi-Fi™. In some embodiments the user interface of the control device can be developed using Windows Presentation Foundation (WPF). Again, it will be understood that this is exemplary only and other frameworks and toolkits may be used to create the graphical user interface. The user interface can be used to interface with at least the Media Player tool 120 and Pitch Recorder Manager tool 124 via HLA interactions and objects, but other interface mechanisms may be used, such as a direct TCP connections.

A first example 700 of the user interface is shown in FIG. 7A and includes four control areas 702A-702D, each of which can be used to individually control the output on a respective area/display device 202 of the display 200 (e.g. the four sets of video data 502A-502D of FIG. 5). Bookmarks and the like can be provided on each of the control areas. The user interface further includes a control panel area 704, which can control overall playback of the video data and offer features such as time navigation controls, scrubbing, jump to bookmarks, time interval to jump forwards or backwards byetc. Customisable Time Offsets to the jump to bookmark can be defined to ensure the event is not missed when jumping directly to a bookmark event.

This section of the user interface is dynamically generated based on the number of simulators in the selected recording. For example, if a recording contained four simulator devices, there would be four timeline views (one for each device), which is what is shown in FIG. 7A (devices EDCT A-EDCT D). The timeline for each device also displays related bookmarks. Most of the icons for the bookmarks are created to represent events related to the aircraft system but may represent any event in the tactical scenario. The interface can also provide an indication of 'simulator time' in addition to showing 'recording time'. Furthermore, the interface can allow the muting/unmuting of audio (pilot headset/microphone) for each of the devices listed.

A second example 710 of the user interface is shown in FIG. 7B and provides the ability to change cockpit display layouts, enable/disable blending, and so on. Although not illustrated this interface may also provide ability to select a video stream to be drawn fullscreen and return video stream to the layout defined size. In addition it may be used to reposition and resize the displayed video streams.

FIG. 8 illustrates another example of the user interface of the control device 114, intended to interact with a tactical map 802 (also shown schematically at 118 in FIG. 1) that can be shown on at least a portion of the display 200 of the system 100. The example of FIG. 8 shows that a control interface 804 for the tactical map is visible on the touchscreen of the control device, along with a copy of the map, but that control interface is not shown on the tactical map shown on the display 200. The interface can allow users to use the tactical map and timeline with event bookmarks as markers to navigate, rather than visually based on video data. The tactical map provides a variety of textual and graphical overlays to display information relating to the entities drawn on the map and allows relative information between entities to be displayed.

In some embodiments the Tactical Map with controls is a separate software application, which can be executed by a component of the system 100, such as the control device 114, or any other computing device that is in communication with the system. The software application can process data describing individual map/geographical features (rather than video data) of the tactical map. In some embodiments Desktop Windows Manager (DWM) may provides a hardware accelerated repeat of the tactical map and controls display windows, embedded in the control device. Touchscreen inputs can be passed back to the Tactical Map application using standard Windows API calls. Thus, embodiments can provide improved control of map information, in combination with simulator video data, compared to conventional solutions where the tactical map data is provided in the form of recorded video with limited control ability. Thus, embodiments can offer control of the entire system from a single HD touchscreen monitor, with a live repeat of the tactical map (e.g. drawn across 2 UHD displays), embedded in the user interface, thereby allowing remote control of the map and management of its information displays from the touchscreen, along with video window layout selection and full control over time navigation of the playback of a recording.

Embodiments solve problems associated with conventional solutions as it is difficult to find COTS products that provide the desired functionality. Embodiments can be tuned to cope with high bandwidth of streams associated with multiple simulators, especially during high speed playback. Embodiments can offer integration of a number of systems and applications (e.g. different software languages) and offer control from a single application/control device.

The skilled person will appreciated that embodiments of the components described herein can be implemented using any suitable software applications, programming languages, data editors, etc, and may be represented/stored/processed using any suitable data structures, and so on. It will also be understood that the steps described herein as part of the detailed embodiments may be re-ordered, omitted and/or repeated. Additional steps may also be performed. Some steps may be performed concurrently instead of sequentially.

Attention is directed to any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A simulator data processing system comprising:
    a display;
    at least one encoder processor configured to:
        receive a plurality of simulator data generated by a respective plurality of simulators, wherein the plurality of simulator data comprises a respective plurality of video data and non-audio/visual simulator data, and wherein at least one of the plurality of video data has a different frame rate as compared to another of the plurality of video data;
        capture the plurality of video data generated by the respective plurality of simulators and output a respective plurality of compressed video streams, wherein the at least one encoder processor comprises a scheduler configured to use frames of the plurality of video data to generate a set of scheduled items, the scheduler being further configured to specify a frame rate for capturing the frames; and
        generate encoded data based on the plurality of compressed video streams and the non-audio/visual simulator data; and
    at least one further processor configured to receive the encoded data and decode and process the encoded data so that a plurality of decoded video data are simultaneously displayed on the display at the specified frame rate wherein the at least one further processor is configured to execute a media player/renderer application that processes the compressed video streams for rendering on the display;
    wherein the at least one further processor is also configured to display information based on the non-audio/visual simulator data on the display.

2. The system according to claim 1, wherein the at least one encoder processor utilises a hardware video encoder on a Graphics Processing Unit to output the at least one respective compressed video stream.

3. The system according to claim 1, wherein the at least one encoder processor is configured to provide multiple instances of the encoded video data having different frame rates to a plurality of the further processors.

4. The system according to claim 1, wherein the at least one further processor utilises a hardware video decoder on a Graphics Processing Unit to render the compressed video stream.

5. The system according to claim 4, wherein a media player/renderer is configured to decode each of a plurality of video streams of the compressed video stream independently and render each said decoded video stream at a rate corresponding to a rate at which a corresponding video data of the plurality of video data is received.

6. The system according to claim 1, wherein at least one further processor is configured to blend together at least two of the video streams of the compressed video stream for display on an area of the display.

7. The system according to claim 6, wherein a first of the video streams being blended has a lower frame rate than a second of the video streams being blended, and the media player/renderer stores a video frame from the first video stream for blending with each video frame of the second video stream.

8. The system according to claim 1, further comprising a control device that configures and/or controls a location and format of the video data on the display, wherein the control device offers display control functions selected form a set including:
- full recording and playback control;
- playback from ¼ speed up to x32, forward and backwards;
- tactical scenario viewer;
- timeline and event markers implemented as manual and automatic bookmarks;
- audio channel and video display layout control;
- audio volume control;
- recording or device to live monitor selection;
- video stream layout selection;
- playback navigation, including timeline and event bookmarks;
- tactical map management;
- recording management;
- cropping of video streams; and
- synchronised playback of audio.

9. The system according to claim 8, wherein the control device controls the display to display a tactical map, and the control device includes a control interface for the tactical map, wherein the control interface is not visible on the tactical map displayed on the display, and the control device is configured to execute a software application that processes data describing individual mapped geographical features of the tactical map.

10. The system according to claim 1, wherein the system is adapted for the simulation of a vehicle mission.

11. The system according to claim 10, wherein the system is adapted for the simulation of an aircraft mission.

12. The system according to claim 10 wherein the non-audio/visual simulator data comprises data relating to at least one of the following:
- sensor readings;
- geographical location information; and
- mission-related information.

13. A computer-implemented method of processing simulator data, the method comprising:
- receiving a plurality of simulator data generated by a respective plurality of simulators, wherein the plurality of simulator data comprises a respective plurality of video data and non-audio/visual simulator data, and wherein at least one of the plurality of video data has a different frame rate as compared to another of the plurality of video data;
- capturing the plurality of video data generated by the respective plurality of simulators, and outputting a respective plurality of compressed video streams using at least one encoder, wherein the at least one encoder comprises a scheduler that uses frames of the plurality of video data to generate a set of scheduled items and specifies a frame rate for capturing the frames;
- generating encoded video data based on the plurality of compressed video streams and the non-audio/visual simulator data; and
- receiving the encoded data and decoding and processing the encoded data so that the plurality of decoded video data are displayable on a display at the specified frame rate by executing a media player/renderer application that processes the compressed video streams for rendering on the display; and
- displaying information based on the non-audio/visual simulator data on the display.

14. The method according to claim 13 wherein the plurality of simulator data simulates a vehicle mission.

15. The method according to claim 13 wherein the non-audio/visual simulator data comprises data relating to at least one of the following:
- sensor readings;
- geotraphical location information; and
- mission-related information.

* * * * *